Patented June 17, 1952

2,600,766

UNITED STATES PATENT OFFICE 2,600,766

HYDROLYSIS OF ALPHA-HYDROCARBON-ALPHA,BETA-DIHALOCARBONYLIC COMPOUNDS

George W. Hearne and Carl G. Schwarzer, El Cerrito, Calif., assignors to Shell Development Company, San Francisco, Calif., a corporation of Delaware No Drawing. Application January 14, 1949, Serial No. 71,034

3 Claims. (Cl. 260—593)

This invention relates to the hydrolysis of alpha-hydrocarbon-alpha, beta-dihalocarbonylic compounds into the corresponding dihydroxy derivative, and it is also concerned with the rearrangement of various of said dihydroxy derivatives into vicinal diketones. The invention is illustrated by the hydrolysis of 2-methyl-2,3-dichloropropionaldehyde into 2-methyl-2,3-dihydroxypropionaldehyde, and by the subsequent rearrangement of the latter compound into diacetyl and water.

It is known that primary halides of the type of ethyl chloride and propyl chloride may be hydrolyzed to form the corresponding alcohols, though some olefins are also produced during the reaction. In the case of secondary halides such as 2-chlorobutane and 2-chloropentane, however, the yield of alcohol on hydrolysis is considerably less and the product contains a higher relative proportion of olefins. With tertiary halides it has heretofore been considered that hydrolysis is productive in the main of olefins and of even smaller quantities of the alcohol. In this connection see, for example, page 75 of Whitemore's text "Organic Chemistry" (1937), D. van Nostrand Company, Inc., New York.

It is our discovery that tertiary halides of the alpha hydrocarbon-alpha,beta-dihalocarbonylic type may readily be hydrolyzed, and in good yield, to form the corresponding alpha-hydrocarbon-alpha, beta-dihydroxycarbonylic derivative, the hydrolysis being conducted in the presence of sodium bicarbonate or other basic acting material capable of reacting with the hydrohalide released during hydrolysis as well as maintaining the solution at substantial neutrality during the reaction interval. It also forms a feature of the present invention that the resulting hydrolyzed products of the alpha-hydrocarbon-alpha, beta-dihydroxyaldehyde variety are, in acid solution, rearranged to form vicinal ketones, i. e., alpha-beta-dioxohydrocarbon derivatives.

The term "alpha-hydrocarbon-alpha, beta-dihalocarbonylic compounds" is employed herein to designate those compounds having the following structural formula:

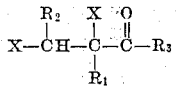

wherein the X's represent halogen atoms, $R_1$ represents a hydrocarbon radical, and $R_2$ and $R_3$ represent members selected from the group consisting of the hydrogen atoms and organic radicals. Preferably the X's are chlorine or bromine atoms, $R_1$ is a hydrocarbon radical such as alkyl, aryl, cycloalkyl or the like which is free of aliphatic unsaturation, and $R_2$ and $R_3$ are members selected from the group consisting of the hydrogen atom and hydrocarbon radicals. The structure of the alpha-hydrocarbon-alpha, beta-dihydroxycarbonylic hydrolysis products is the same as that given above for the dihalo starting compounds except that here the X's represent hydroxy radicals instead of halogen atoms.

The hydrolysis reaction of the present invention may be illustrated by the following general equation:

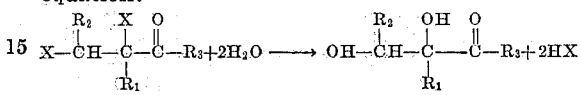

wherein the symbols X, $R_1$, $R_2$ and $R_3$ are as described in the preceding paragraph.

Exemplary starting compounds of the alpha-hydrocarbon-alpha,beta-dihalocarbonylic type, any of which may be used in the foregoing reaction, are: 2-methyl-2,3-dichloropropionaldehyde; 2-ethyl-2,3-dichloropropionaldehyde; 2-propyl-2,3-dibromopropionaldehyde; 2-ethyl-2,3-dichloropropionaldehyde; 2-propyl-2,3-dichloropropionaldehyde; 2-heptyl-2,3-dichloropropionaldehyde; 2 - isobutyl - 2,3 - dichloropropionaldehyde; 2 - dodecyl - 2,3 - dichloropropionaldehyde; 2 - cyclohexyl - 2,3 - dichloropropionaldehyde; 2-phenyl - 2,3 - dichloropropionaldehyde; 2 - benzyl - 2,3 - dichloropropionaldehyde; 2 - methyl - 2,3 - dibromopropionaldehyde; 2 - heptyl - 2,3 - dibromopropionaldehyde; 2 - isobutyl - 2,3 - dibromopropionaldehyde; 2 - dodecyl - 2,3 - dibromopropionaldehyde; 2 - cyclohexyl - 2,3 - dibromopropionaldehyde; 2 - phenyl - 2,3 - dibromopropionaldehyde; 2-benzyl - 2,3 - dibromopropionaldehyde; 3,4 - dichloro - 3 - methylbutan - 2 - one; 1,2-dichloro - 2 - methylpentan - 3 - one; 1,2 - dichloro - 2 - ethylpentan - 3 - one; 1,2 - dichloro - 2 - phenylheptan - 3 - one; 1,2 - dichloro - 2 - cyclohexylpentan - 3 - one; 2,3-dichloro - 2 - methylpropiophenone; 2 - methyl - 2,3 - dihalobutyraldehyde; 3 - cyclohexyl - 2 - methyl - 2,3 - dichloropropionaldehyde; 2,4 - dimethyl - 2,3 - dichlorovaleraldehyde; 2 - ethyl - 3 - phenyl - 2,3 - dichloropropionaldehyde; 3 - methyl - 3,4 - dichloropentan - 2 - one; 1 - phenyl - 2 - ethyl - 2,3 - dichlorobutan - 1 - one; 1,3 - diphenyl - 2 - ethyl-2,3-dichloropropan-1-one. Of the above compounds, the preferred member is 2-methyl-2,3-dichloropropionaldehyde, a compound which is also referred to as alpha,beta-dichloroisobutyraldehyde.

The hydrolysis reaction of the present invention is carried out in the presence of at least 2 moles of water for each mole of the dihalide reactant, and preferably water is present in a considerable excess over this ratio, it normally comprising the solvent medium for the dihalide reactant. Also present in the solution is one or more basic acting compounds such as sodium bicarbonate, disodium carbonate, sodium phosphate, sodium acetate, a mixture of mono- and disodium phosphates, or the corresponding potassium or lithium compounds, for example, which compounds are capable of maintaining the reaction mixture at near-neutrality and preferably within the pH range of from 6 to 8. Thus, the basic acting additive should be present in an amount at least sufficient to react with the hydrohalide (viz, HCl or HBr) released during the hydrolysis operation. In the case of the stronger bases such as sodium hydroxide or calcium hydroxide, which may also be used as the basic acting additive, it is preferable to add the same in increments as the reaction progresses, the amount added at any one time being insufficient to raise the pH of the solution substantially above 8, the pH in any event being maintained below the point at which substantial condensation of the carbonylic reactant occurs. With compounds such as sodium bicarbonate, however, and the various acetate or phosphate buffers, it is not necessary to take such precautions since these materials form solutions of substantial neutrality even when present in high concentration. At the same time, care should be taken that the pH does not become unduly low, it preferably being maintained at a value of 6 or above at all times since the reaction ceases to progress as the acidity of the solution increases.

The hydrolysis reaction of the present invention goes forward in some degree at room temperatures, though the reaction is much more rapid when elevated temperatures are used, the latter term being employed herein to designate temperatures of at least 50° C. and preferably those between 50 and 100° C. Thus, a reaction which requires one or more days at 20° C. will be substantially completed in approximately 6 hours at 60° C., and in about 2 hours at 100° C. The pressure maintained in the reaction vessel is not critical.

The present invention is illustrated in part by the following example:

Example I

In this operation 96 grams (0.82 mole) of 2-methyl-2,3-dichloropropionaldehyde were added to a solution of 120 grams (1.43 moles) of sodium bicarbonate in 500 cc. of water. The reaction was conducted at room temperature for 24 hours after which time a small quantity of the dichloride had hydrolyzed. The temperature was then increased to 60° C. where the reaction was essentially complete after 6 hours. Titration showed that 82.5% of the dichloride starting material had hydrolyzed and roughly 77% of the original carbonyl remained after this treatment. No organic acids were present as determined by potentiometric titration. The crude product obtained was then acidified to pH 1.4, and nitrogen was bubbled through the acid solution to sweep out dissolved carbon dioxide. After this treatment the pH was adjusted to 7.2 and the product distilled under reduced pressure at room temperature to remove its water content. The bottoms from the distillation were dissolved in ethyl alcohol and filtered to remove inorganic salts. The solvent was then removed by distillation leaving behind a light colored, viscous, sweetish smelling residue which represented 88.7% yield in terms of the 2-methyl-2,3-dichloropropionaldehyde starting material. This residue was made up in large part of 2-methyl-2,3-dihydroxypropionaldehyde and contained substantially no olefins. The fact that the above residue contained 2-methyl-2,3-dihydroxypropionaldehyde as its major fraction was determined by hydrogenating the crude material in aqueous solution at 2000 p. s. i. and at 100° C., using Raney nickel as catalyst and with the addition of 0.5% by weight of acetic acid. Under this treatment 0.331 mole of hydrogen was absorbed which accounted for 71.8% of the theoretical, assuming all the product to be monomeric dihydroxyaldehyde. From the distillation of this hydrogenated product there were isolated four fractions. The first cut, amounting to 15% by weight of the charge, boiled above 80° C. at atmospheric pressure and was thought to consist largely of ethanol. The second cut, boiling between 75 and 101° C. at 1.5 mm. Hg. and representing approximately 11% by weight of the charge, was thought to be butane-2,3-diol. The major fraction (41%) was identified as beta-methylglycerol. It boiled between 101 and 123° C. at 1.5 mm. Hg., had a refractive index $n_D^{20}$ of 1.4690, and yielded methacrolein on dehydration. The reported boiling point of beta-methylglycerol is 115 to 120° C. at 1.6 mm. Hg. and its refractive index $n_D^{20}$ is 1.4730 (Ind. Eng. Chem. 33, 940 (1941)). The methacrolein was identified by odor and by its 2,4-dinitrophenylhydrazone derivative which melted at 197 to 199° C. The material which comprised the bottoms of the distillation, which was polymeric in nature, accounted for 33% by weight of the charge.

The behavior of the 2-methyl-2,3-dichloropropionaldehyde reactant of the foregoing example is to be compared with that of 2,3-dichloropropionaldehyde which, on being given a treatment similar to that described above, does not hydrolyze but instead loses hydrogen chloride to form alpha-chloroacrolein.

It also forms a feature of the present invention that hydrolyzed compounds of the alpha-hydrocarbon-alpha-beta-dihydroxyaldehyde variety may be converted into vicinal diketones by maintaining the solution of the dihydroxy compound in the acid condition. This rearrangement is illustrated by the following general equation:

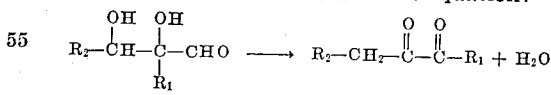

wherein $R_1$ is a hydrocarbon radical which preferably is free of aliphatic unsaturation and $R_2$ is a member selected from the group consisting of the hydrogen atom and organic, preferably hydrocarbon, radicals.

The foregoing rearrangement occurs freely when the solution is acidified with hydrochloric, sulfuric, phosphoric or other (preferably mineral) acid catalyst and the pH is thereafter maintained below a value of about 5. Some rearrangement occurs when the resulting acidified solution is allowed to stand even at room temperatures, though the reaction is greatly speeded up by maintaining the solution at elevated temperatures above 50° C. The preferred practice in this respect is to reflux the solution at either atmospheric, subatmospheric or superatmospheric pressures for periods of at least ½ hour, and more preferably, with simultaneous removal of water present in the reaction mixture.

Representative acid-catalyzed rearrangements of the type here contemplated are those whereby 2-methyl-2,3-dihydroxybutyraldehyde is converted to pentane-2,3-dione; 3-cyclohexyl-2-methyl-2,3-dihydroxypropionaldehyde is converted to 4-cyclohexylbutane-2,3-dione; 2-ethyl-3-phenyl-2,3-dihydroxypropionaldehyde is converted to 1-phenylpentane-2,3-dione; 2-methyl-2,3-dihydroxypropionaldehyde is converted to diacetyl; 2-ethyl-2,3-dihydroxypropionaldehyde is converted to pentane-2,3-dione; 2-propyl-2,3-dihydroxypropionaldehyde is converted to hexane-2,3-dione; 2-isobutyl-2,3-dihydroxypropionaldehyde is converted to 5-methylhexane-2,3-dione; 2-cyclohexyl-2,3-dihydroxypropionaldehyde is converted to 1-cyclohexylpropane-1,2-dione; and 2-phenyl-2,3-dihydroxypropionaldehyde is converted to 1-phenylpropane-1,2-dione.

The rearrangement of the above described class of dihydroxy compounds into the corresponding vicinal diketones is illustrated by the following example:

*Example II*

To 85 grams of sodium bicarbonate in 150 cc. of water were added 73.5 grams of 2-methyl-2,3-dichloropropionaldehyde, and the solution was then heated for 2 hours at 100° C., thereby completing the hydrolysis step. The resulting solution was acidified with HCl to a pH of about 1.5 and then extracted with diethyl ether for 14 hours, thereby isolating 12 grams of a dark, viscous liquid of undetermined composition. The larger, unextractable part of the hydrolyzed product was then concentrated under reduced pressure at room temperature to remove the water present. The resulting product was then distilled and a cut was obtained which accounted for 14.5% by weight of the dichlorohalide introduced. This cut was redistilled and a fraction boiling between 60 and 105° C. was obtained which was shown to consist mainly of diacetyl as identified by odor, color, the nickel dimethylglyoxime salt, and the disemicarbazone derivative which melted at 280° C. (reported value, 278 to 279° C.). It is obvious that the diacetyl was formed subsequent to the ether extraction step since any diacetyl present in the crude hydrolyzed mixture would have been extracted by the ether.

The invention claimed is:

1. In a process for the production of vicinal ketones of the general formula

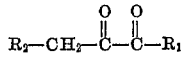

wherein a liquid reaction mixture containing an alpha - hydrocarbon-alpha,beta - dihydroxyaldehyde is produced in accordance with the reaction

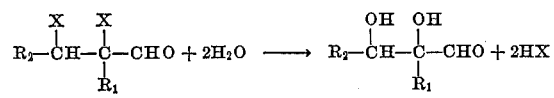

said reaction being conducted in the presence of a quantity of a basic acting compound at least sufficient to react with the hydrogen halide (HX) formed during the reaction, the steps comprising acidifying the said alpha-hydrocarbon-alpha,beta-dihydroxyaldehyde-containing reaction mixture and maintaining the pH thereof below 5 while the acidified reaction mixture is heated at a temperature above 50° C. for at least ½ hour while simultaneously distilling off the water contained in the mixture, thereby forming said vicinal ketones in accordance with the reaction

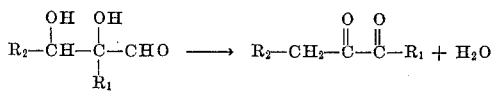

the X's in the general formulae employed above representing halogen atoms, the $R_1$'s representing hydrocarbon radicals free of aliphatic unsaturation, and the $R_2$'s representing members selected from the group consisting of the hydrogen atom and hydrocarbon radicals free of aliphatic unsaturation.

2. In a process for the production of diacetyl wherein a liquid reaction mixture containing 2-methyl-2,3-dihydroxypropionaldehyde is produced in accordance with the reaction

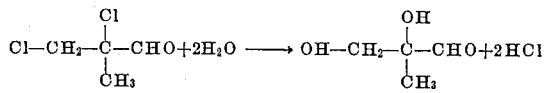

said reaction being conducted in the presence of a quantity of a basic acting compound at least sufficient to react with the hydrogen chloride formed during the reaction, the steps comprising acidifying the said 2-methyl-2,3-dihydroxypropionaldehyde-containing solution and maintaining the pH thereof below 5 while the acidified reaction mixture is heated at a temperature above 50° C. for at least ½ hour while simultaneously distilling off the water contained in the mixture, thereby forming said diacetyl in accordance with the reaction

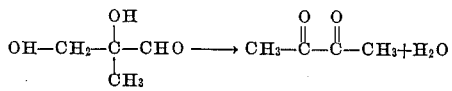

3. The process of claim 2 wherein the basic acting compound is an alkali metal bicarbonate.

GEORGE W. HEARNE.
CARL G. SCHWARZER.

REFERENCES CITED

The following references are of record in the file of this patent:

De Bruyn et al., Rec. trav. Chim. des Pays Bas, vol. 17, pages 259–262 (1898).

Faworsky et al., J. fur Praktische Chemie, Band 196, N. F. 88, pages 641–698 (1913). Pages 663, 668, 674, 675, 682, 685, 686, 688, 689, 691, 692, and 693–698 are especially pertinent.

Lichtenberger et al., Bul. Soc. Chimique de France, Series 5, vol. 4, pages 325–332 (1937). 260–602.

Glattfeld et al., J. Am. Chem. Soc., vol. 60, pages 1011–1014 (1938).